United States Patent [19]

Beylat et al.

[11] Patent Number: 5,082,376
[45] Date of Patent: Jan. 21, 1992

[54] OPTICAL FIBER FEEDER ASSEMBLY INCLUDING AN AMPLIFIER

[75] Inventors: Jean-Luc Beylat, Paris; Fabrice Pitel, Monthlery; Michel Monnot, Orsay, all of France

[73] Assignee: Alcatel CIT, Paris, France

[21] Appl. No.: 672,798

[22] Filed: Mar. 21, 1991

[30] Foreign Application Priority Data

Mar. 23, 1990 [FR] France .................. 90 03755

[51] Int. Cl.$^5$ .......................... G02B 6/26; G02B 6/42
[52] U.S. Cl. .................................................. 385/3
[58] Field of Search ................... 350/96.15; 330/4.3

[56] References Cited

U.S. PATENT DOCUMENTS 3,752,992  8/1973  Fluhr ............................. 250/199
4,943,782  7/1990  Stephens ......................... 330/4.3

FOREIGN PATENT DOCUMENTS

WO8909505  10/1989  PCT Int'l Appl.

OTHER PUBLICATIONS

Patent Abstracts of Japan, vol. 10, No. 247 (P-490)[2303], Aug. 26, 1986; & JP-A-61 77 028 (Fujitsu Ltd.), 4/19/86.
Patent Abstracts of Japan, vol. 12, No. 493 (E-697)[3340], Dec. 22, 1988; & JP-A-63 205 893 (NEC Corp.), 8/25/88.
Patent Abstracts of Japan, vol. 12, No. 399 (P-775)[3246], Oct. 24, 1988; & JP-A-63 139 318 (Fujitsu Ltd), 6/11/88.

Primary Examiner—William L. Sikes
Assistant Examiner—Robert E. Wise
Attorney, Agent, or Firm—Sughrue, Mion, Zinn Macpeak & Seas

[57] ABSTRACT

The assembly is implemented in the form of an optical head integrating not only an optical isolator (6, 8), but also a semiconductor amplifier and phase modulator (18). The amplifier-modulator is aligned parallel to the light-emitting laser (2) by a rotation compensator (14, 15) that compensates for the rotation applied by the isolator to the polarization of light from the laser. The invention is particularly applicable to optical fiber telecommunications.

3 Claims, 2 Drawing Sheets

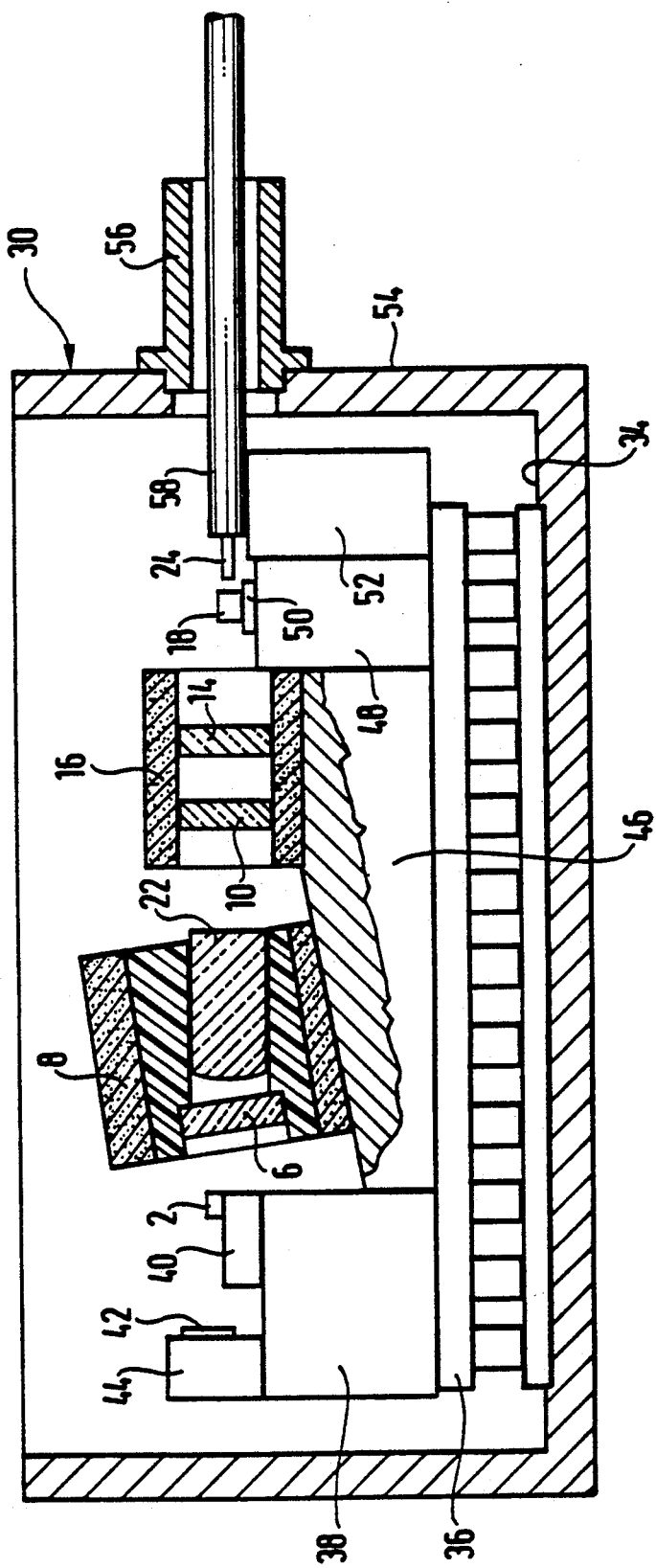

OPTICAL FIBER FEEDER ASSEMBLY INCLUDING AN AMPLIFIER

The present invention relates to transmitting information by optical fiber in the form of modulation on a carrier light wave guided by said fiber, and in particular in the form of phase modulation on said wave.

A feeder assembly designed for such transmission is described in the article "Semiconductor laser optical amplifier as phase modulator in a 140 Mbit/s DPSK transmission experiment" by G. GROSSKOPF, Conf. publ. IOCC 89, Kobe, 1989.

In that prior assembly, a light source which is isolated from optical back feed itself feeds a semiconductor amplifier via an intermediate optical fiber, which amplifier amplifies the light wave and simultaneously applies phase modulation thereto representative of the information to be transmitted. The resulting wave is then injected into a monomode line fiber.

Such an assembly suffers from the following drawbacks:

The amplifier-modulator performs properly only if it receives light that is polarized in a preferred amplification direction specific to the amplifier. The intermediate optical fiber must therefore be suitable for transmitting a light wave thereto having said polarization, and to make this possible it must be suitable for maintaining such polarization. In other words the fiber must have intrinsic or induced birefringence which defines directions in which it maintains polarization. It is therefore necessary to begin by coupling the intermediate fiber firstly to the optical head and secondly to the amplifier-modulator. It is then necessary to match one of the polarization-maintaining directions of the fiber firstly to the polarization of the light leaving the optical head, and secondly to the preferred amplification direction of the amplifier-modulator. It is therefore difficult to make such an assembly.

The assembly is excessively fragile and bulky.

To mitigate these drawbacks, the present invention seeks to provide such an assembly in the form of an optical head which integrates not only the light-emitting laser and the optical isolator, but also the amplifier-modulator. In order to make it possible for such a head to be manufactured under industrial conditions, the amplifier must be aligned with respect to polarization directions in such a manner that its preferred amplification direction is parallel to the polarization direction of the light-emitting laser. This is made compatible with the fact that the optical isolator rotates light polarization by using a rotation compensator which rotates the polarization in the opposite direction.

An implementation of the present invention is described below with reference to the accompanying diagrammatic figures, it being understood that items and dispositions described and shown are given purely by way of non-limiting example. When the same item appears in more than one of the figures, it is designated therein by the same reference symbol.

FIG. 3 is a longitudinal section through an optical head embodying the assembly of FIG. 1.

Figure 1:
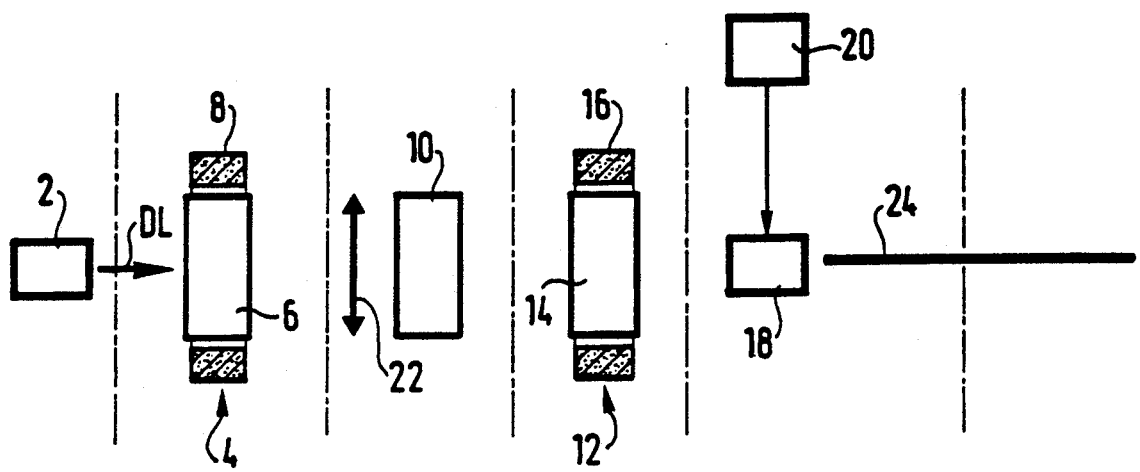
FIG. 1 is a theoretical diagram of an assembly of the present invention.

With reference to FIGS. 1 and 3, the assembly given by way of example comprises the following:

A semiconductor light-emitting laser 2 for emitting light that propagates forwards in a longitudinal direction DL and that is polarized in a first transverse direction D1.

A rotator 4 for transmitting said light and rotating its polarization through 45° in a predetermined direction of rotation so as to align it with a second transverse direction D2. This rotator is constituted by a Faraday effect plate 6 placed in the field of an annular permanent magnet 8.

A polarizer 10 for transmitting the light it receives from the rotator 4 and for stopping any light component that is polarized in a direction perpendicular to the second transverse direction. The polarizer and the rotator 4 together constitute an optical isolator preventing any return light that is propagating backwards towards said isolator reaching the laser 2 with polarization in the first transverse direction. Such light would disturb the operation of the laser.

A rotation compensator 12 made up in the same way as the rotator 4, i.e. by a plate 14 and a magnet 16. This compensator rotates the polarization of light through 45° to bring it back into alignment with the direction D1.

A semiconductor amplifier-modulator 18 having a preferred amplification direction which is the polarization direction of light as transmitted forwards by the polarizer 10. This amplifier selectively amplifies light having such polarization. Simultaneously it applies a controlled phase shift thereto.

A control member 20 for receiving a modulation signal and for controlling the phase shift amplified by the amplifier-modulator 18 as a function of this signal.

And optical coupling means 22 for injecting the light transmitted by said amplifier-modulator into a line optical fiber 24.

Figure 2:
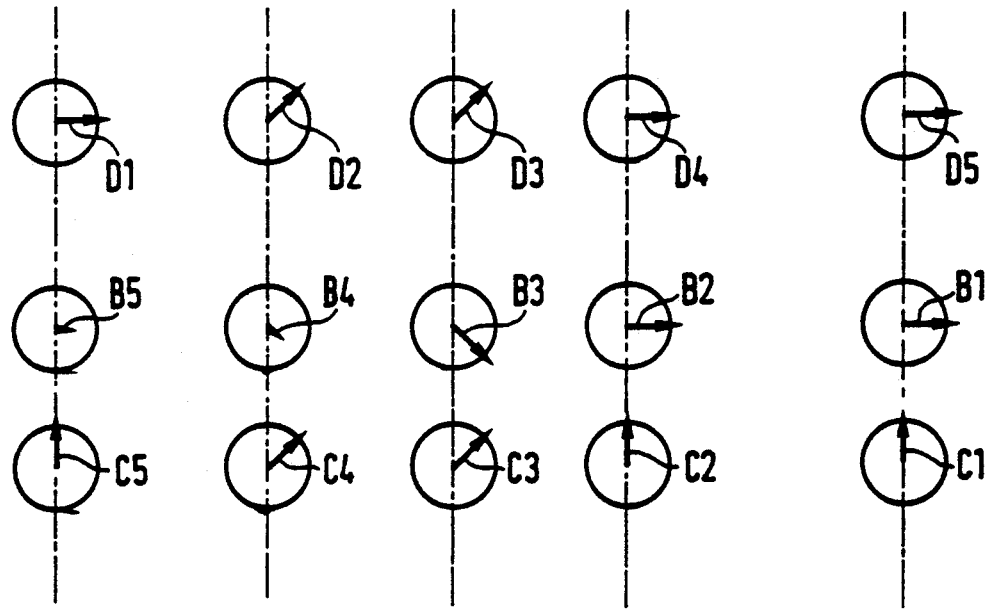
FIG. 2 shows the succession of light polarization directions in the assembly.

In FIG. 2, arrows D1 to D5 show the successive polarization directions of light propagating forwards. Arrows B1 to B5 show successive polarization directions of a returning light component that would disturb the operation of the light-emitting laser 2 were it not stopped by the polarizer 10. This effect is symbolized by the reduced length of arrows B4 and B5. Arrows C1 to C5 represent successive polarization directions of a different return light component that has little effect on the operation of the laser 2.

The vertical direction in this figure corresponds to the vertical direction in FIGS. 1 and 3. The horizontal direction in FIG. 2 represents the direction perpendicular to the planes of FIGS. 1 and 3.

In addition to items described above, FIG. 3 shows a housing 30 having a temperature regulation plate 36 including heater elements placed on its bottom 34. The plate 36 carries a sequence of blocks. A block 38 carries the laser 2 via a laser base 40, and also a regulation diode 42 via a diode base 44. The diode receives the light which the laser 2 emits backwards. It enables the operation of the laser to be regulated by means of external circuits, not shown. A block 46 carries firstly a subassembly including the rotator 6, 8 and a Selfoc lens 22 constituting said optical coupling means. It then carries another subassembly including the rotation compensator 14, 16 and the polarizer 10. The outside shells of these subassemblies are constituted by annular magnets 8 and 16.

The Faraday effect plate 6 is inclined to avoid disturbing reflections reaching the laser 2.

A block 48 carries the amplifier-modulator 18 via an amplifier base 50. The internal structure of the amplifier is similar to that of the laser 2 and the way they are mounted on their bases 40 and 50 must be similar if it is desired to avoid implementation difficulties which would increase the cost of the assembly. As a result, the preferred polarization in which amplification takes place properly within the amplifier-modulator 18 must be the same direction D1 as the polarization direction of the light emitted by the laser 2, which direction is horizontal, i.e. perpendicular to the plane of the figure.

Finally, a block 52 carries the line fiber 24 in a position that ensures it is coupled to the amplifier-modulator 18.

These various blocks are in contact with one another via transverse contact faces.

The front wall 54 of the housing 30 also carries components 56 for guiding and holding the covering 58 of the fiber 24.

We claim:

1. An optical fiber feeder assembly including an amplifier, the assembly being implemented in the form of an optical head including an optical isolator (6, 8) that rotates light polarization, the assembly being characterized by the fact that the amplifier it includes is a semiconductor amplifier-modulator (18) that preferentially amplifies light polarized in a direction specific to the amplifier, said direction being aligned parallel to the polarization direction of the light-emitting laser (2) by a rotation compensator (14, 16) that rotates light polarization in the opposite direction.

2. An assembly according to claim 1, comprising:
   a semiconductor light-emitting laser (2) for emitting light that propagates forwards along a longitudinal direction (DL) and that is polarized in a first transverse direction (D1);
   a rotator (4) transmitting said light from said laser while rotating its polarization through 45° in a rotation direction of said rotator so as to align said polarization with a second transverse direction (D2);
   a polarizer (10) for transmitting the light it receives from said rotator and for stopping any light component polarized in a direction perpendicular to said second transverse direction, thereby co-operating with said rotator to constitute an isolator preventing any return light that is propagating backwards towards the isolator reaching said laser (2) with a polarization in said first transverse direction which could disturb operation of the laser;
   a semiconductor amplifier (18) having a preferred amplification direction for receiving light from said polarizer and transmitting it forwards with polarization in said preferred amplification direction, and for selectively amplifying light having such polarization; and
   optical coupling means (22) for injecting the light transmitted by said amplifier into a line optical fiber (24);
   said assembly being characterized by the fact that it further includes a rotation compensator (12) interposed between said polarizer (10) and said amplifier (18) to rotate light polarization through 45° in a direction opposite to said direction of rotation of said rotator (4), thereby aligning said preferred amplification direction parallel with said first transverse direction (D1);
   said laser (2), rotator, polarizer, rotation compensator, amplifier, and optical coupling means being supported in a single housing (30); and
   said housing further including means (52) for holding said line fiber (24).

3. An assembly according to claim 2, characterized by the fact that said amplifier (18) is an amplifier and phase modulator for applying a phase shift to the light it amplifies;
   said assembly further including a control member (20) for receiving a modulation signal and for controlling said phase shift in response thereto.

* * * * *